(12) United States Patent
Beuerle et al.

(10) Patent No.: US 10,682,802 B2
(45) Date of Patent: Jun. 16, 2020

(54) INJECTION NOZZLE WITH FINISH COOLING AND COUNTER PRESSURE

(71) Applicants: DISCMA AG, Hunenberg (CH); Frederick C. Beuerle, Jackson, MI (US); G. David Lisch, Jr., Jackson, MI (US); Richard Steih, Jackson, MI (US); Semen Kharchenko, Ann Arbor, MI (US); Pankaj Kumar, Dexter, MI (US)

(72) Inventors: Frederick C. Beuerle, Jackson, MI (US); G. David Lisch, Jr., Jackson, MI (US); Richard Steih, Jackson, MI (US); Semen Kharchenko, Ann Arbor, MI (US); Pankaj Kumar, Dexter, MI (US)

(73) Assignee: DISCMA AG, Zürich (CH)

(*) Notice: Subject to any disclaimer, the term of this patent is extended or adjusted under 35 U.S.C. 154(b) by 336 days.

(21) Appl. No.: 15/314,389

(22) PCT Filed: May 29, 2014

(86) PCT No.: PCT/US2014/039977
§ 371 (c)(1),
(2) Date: Nov. 28, 2016

(87) PCT Pub. No.: WO2015/183279
PCT Pub. Date: Dec. 3, 2015

(65) Prior Publication Data
US 2017/0190095 A1    Jul. 6, 2017

(51) Int. Cl.
*B29C 49/58* (2006.01)
*B29C 49/06* (2006.01)
(Continued)

(52) U.S. Cl.
CPC .............. *B29C 49/58* (2013.01); *B29C 49/06* (2013.01); *B29C 49/12* (2013.01); *B29C 49/46* (2013.01);
(Continued)

(58) Field of Classification Search
CPC ................ B29C 2049/5858; B29C 2049/5889
See application file for complete search history.

(56) References Cited

U.S. PATENT DOCUMENTS

2013/0164404 A1    6/2013    Maki et al.

FOREIGN PATENT DOCUMENTS

| JP | 2009166482 A | * | 7/2009 | ............. B29C 49/58 |
| WO | 2003/022548 A1 | | 3/2013 | |

(Continued)

OTHER PUBLICATIONS

Ohara et al., JP 2009-166482 A Machine Translation (Year: 2009).*

*Primary Examiner* — Ryan M Ochylski
(74) *Attorney, Agent, or Firm* — Eric J. Sosenko; Jonathan P. O'Brien; Honigman LLP

(57) ABSTRACT

An injection nozzle for cooling and providing counter pressure to a neck of a preform during a forming of a container from the preform. The injection nozzle includes a manifold that defines a receiving space into which the neck of the preform is received. A cavity is also defined in a part by an inner wall and an outer wall of the manifold and a plurality of ports are provided through the inner wall to communicate the cavity with the receiving space. When a cooling medium is received into the cavity, the cooling medium is directed through at least some of the ports toward the neck of the preform located within the receiving space.

23 Claims, 11 Drawing Sheets

(51) Int. Cl.
    *B29C 49/12*        (2006.01)
    *B29C 49/46*        (2006.01)
(52) U.S. Cl.
    CPC ............... *B29C 2049/4664* (2013.01); *B29C 2049/5803* (2013.01); *B29C 2049/5889* (2013.01)

(56)         References Cited

FOREIGN PATENT DOCUMENTS

WO      2013/096609 A1   6/2013
WO      2013/145511 A1   10/2013

* cited by examiner

INJECTION NOZZLE WITH FINISH COOLING AND COUNTER PRESSURE

CROSS-REFERENCE TO RELATED APPLICATIONS

This application is the U.S. national phase of PCT Application No. PCT/US2014/039977 filed on May 29, 2014, the disclosure of which is incorporated in its entirety by reference herein.

BACKGROUND

1. Field of the Invention

The present invention generally relates to a hydraulic blow molding of a container from a preform, wherein the end product, a liquid, is used as the blow molding medium. More specifically, the present invention relates to preventing distortion and/or deformation of the finish of a preform during the hydraulic blow molding process.

2. Description of Related Art

Plastic containers for liquids are manufactured by various different methods. In most methods, a plastic preform is heated to a suitable temperature for molding, placed within a mold and then expanded axially in radially to form the container. In certain processes, air is used as a blow molding medium to expand the preform. In other processes, the liquid product is used as the blow molding medium. This latter process, using the liquid end product as the blow molding medium, is herein referred to as hydraulic blow mold.

With hydraulic blow molding, the blow molding medium is injected under pressure and generally, in a non-hot fill process, at a temperature in the range of about 0° C. to 32° C. (32° F. to 90° F.) and, in a hot fill process, at a temperature of between about 85° C. and 95° C. (about 185° F. to 195° F.). In many instances, as seen from these temperature ranges, the temperature of the blow molding medium is greater than ambient.

While the body of the preform is axially elongated in radially expanded during the hydraulic blow molding process, the neck or finish of the preform is intended to remain in its initially formed shape. It is important that the finish remain in its initially formed shape since the finish includes threads and sealing surfaces that must be engaged by a closure. It is possible that during hydraulic blow molding, particularly when the blow molding medium as an elevated temperature relative to the temperature of the preform, that the finish will distort and/or deformed as a result of either exposure to the temperature of the blow molding medium or its injection pressure. This becomes more likely when the wall thickness of the finish is reduced in an effort to make the resultant container more light weight.

In order to protect the finish, various strategies have been proposed. US 2013/0164404 discloses a system in which a counter pressure is applied to the exterior of the finish during the blow molding process. WO 2013/145511 similarly discloses a system in which a counter pressure is applied to the exterior of the finish during the blow molding process.

In view of the above, it is apparent that there exists a need for a system in which the finish of a preform is protected during the hydraulic blow molding process, not only from pressure interior of the preform during the process, but also from temperatures of the blow molding medium that result in the finish being susceptible to deformation and distortion.

SUMMARY

In satisfying the above need, as well as overcoming the enumerated drawbacks and other limitations of the prior art, in one aspect of the present invention, an injection nozzle for receiving a neck of a preform and forming of a container from the preform is provided. The injection nozzle includes a nozzle body provided at one end of the injection nozzle, and the nozzle body defining a receiving space adapted to receive the finish of the preform, at least one inlet passageway defined through the nozzle body and communicating with the receiving space, characterized by the fact that the nozzle body is a manifold defining a cavity and portions of the cavity being defined by an inner wall and an outer wall of the manifold, a plurality of ports defined through the inner wall and communicating the cavity with the receiving space, the at least one inlet passageway terminating in communication with the cavity, wherein a cooling medium received from the at least one inlet passageway into the cavity is directed through at least some of the ports toward the finish of the preform located within the receiving space. This construction advantageously provides a means for cooling and/or providing counter pressure to support the finish and prevent possible distortion and deformation. Since the cooling medium is first fed into the cavity of the manifold before exiting through the ports into the receiving space, the cooling medium's temperature and pressure is better equalized across the various ports. Also, the flow rate of the cooling medium entering the receiving space can be independently controlled for each port making it easier to equalize the flow rate of the various ports.

In another aspect, the ports are located circumferentially about the inner wall, providing for equalized distribution of the cooling medium.

In a further aspect, the ports are equally spaced about the inner wall thereby providing uniform distribution of the cooling medium to the preform.

In an additional aspect, the ports defined two rows of ports about the inner wall. This advantageously provides the cooling medium over the entire length of the finish.

In yet another aspect, the ports of each of the two rows of ports are circumferentially offset from one another. The circumferential offset provides still further distribution of the cooling medium to the finish.

In still a further aspect, the ports of one of the rows are perpendicularly oriented relative to a central axis extending longitudinally through the receiving space and the ports of the other of the rows are obliquely oriented relative to the central axis. This orientation of the ports allows for the cooling medium to wash over the finish, and thereby cool the finish, before the finish is fully received within the manifold of the injection nozzle.

In an additional aspect, at least some of the ports are perpendicularly oriented with respect to a central axis extending longitudinally through the receiving space. The perpendicularly oriented ports maximally impact by the finish with the cooling medium.

In still another aspect, at least some of the ports are obliquely oriented with respect to a central axis extending longitudinally through the receiving space. The obliquely oriented ports advantageously provide cooling medium against the finish before the finish is fully received within the manifold of the injection nozzle.

In yet a further aspect, the cavity at least partly encircles the receiving space. By at least partly encircling the receiving space, the cooling medium is more evenly distributed about the finish.

In an additional aspect, the cavity completely encircles the receiving space. By completely encircling the receiving space, the cooling medium is uniformly distributed about the finish.

In another aspect, the manifold defines a first sealing surface adapted to engage an end surface of the preform. This advantageously locates the first seal such the entire length of the finish receives the effects of the cooling medium.

In a further aspect, the inlet passageway includes branch passageways that terminate in the cavity at diametrically opposed positions from one another. The branches further distribute the cooling medium within the cavity.

Advantageously, the injection nozzle defines a longitudinal axis (A) extending through the receiving space that receives the preform.

In an additional aspect, the branch passageways are symmetrical to each other with respect to a symmetry plane that includes the longitudinal axis. By providing symmetrical branches to the inlet passageway, the cooling medium is evenly distributed to the cavity.

In still another aspect, the manifold defines a second sealing surface adapted to engage the preform or to engage a mold receiving the preform, the second sealing surface being at a location axially spaced apart from the first sealing surface. With two axially spaced sealing surfaces, the cooling medium is contained to the finish thereby maximizing the cooling effect and allowing the production of the counter pressure.

In yet a further aspect, the second sealing surface engages a support ring formed on the preform. Utilizing the support ring simplifies the structure and the means of sealing along the finish.

In an additional aspect, an outlet passageway is defined through the manifold and terminates in communication with the cavity, and wherein the cooling medium from the receiving space is directed through the ports into the cavity and from the cavity into the outlet passageway. Having the outlet passage way in communication with the receiving space allows for better withdrawal of the cooling medium from that receiving space.

In yet another aspect, the outlet passageway is defined through the manifold and terminates in communication with receiving space without passing through the cavity. This construction advantageously provides that the outlet passageway will withdraw cooling medium from around the finish, instead of drawing from the cavity In still a further aspect, the outlet passageway terminates in the cavity at a location diametrically opposed from a location where the inlet passageway terminates in the cavity. Opposed inlets and outlets ensure that the cooling medium passes fully about the finish of the preform.

In an additional aspect, the outlet passageway is coupled to a valve. A valve advantageously allows for control of the counter pressure.

In another aspect, the valve includes a variable restriction. A variable restriction advantageously allows for control of the counter pressure.

In a further aspect, an exhaust pathway from the receiving space is defined between the inner wall and a support ring of the preform. Providing the exhaust passage way in this manner simplifies construction.

In an additional aspect, the manifold is formed by a bell housing and a diffuser attached thereto, the inner wall being defined by the diffuser and the outer wall being defined by the bell housing. The construction of the bell housing and diffuser allows for simpler manufacturing of a device that can provide both counter pressure and cooling to the finish of a preform.

According to another aspect of the invention, an injection nozzle of one of the previously mentioned varieties is included in an assembly further comprising a preform and a mold.

In a further aspect, the injection nozzle may be movable with respect with the mold between a reception configuration, that allows introduction of at least part of a body of the preform into the mold, and a fluidic connection configuration, wherein the first sealing surface engages the end surface of the preform and presses a support ring of the preform against the mold.

In another aspect, in the fluidic connection configuration the receiving space is connected to the outside atmosphere by an exhaust path that extends between the manifold and the support ring of the preform or between the manifold and the mold.

Further objects, features and advantages of this invention will become readily apparent to persons skilled in the art after a review of the following description, with reference to the drawings and claims that are appended to and form a part of this specification.

DETAILED DESCRIPTION

Figure 1:
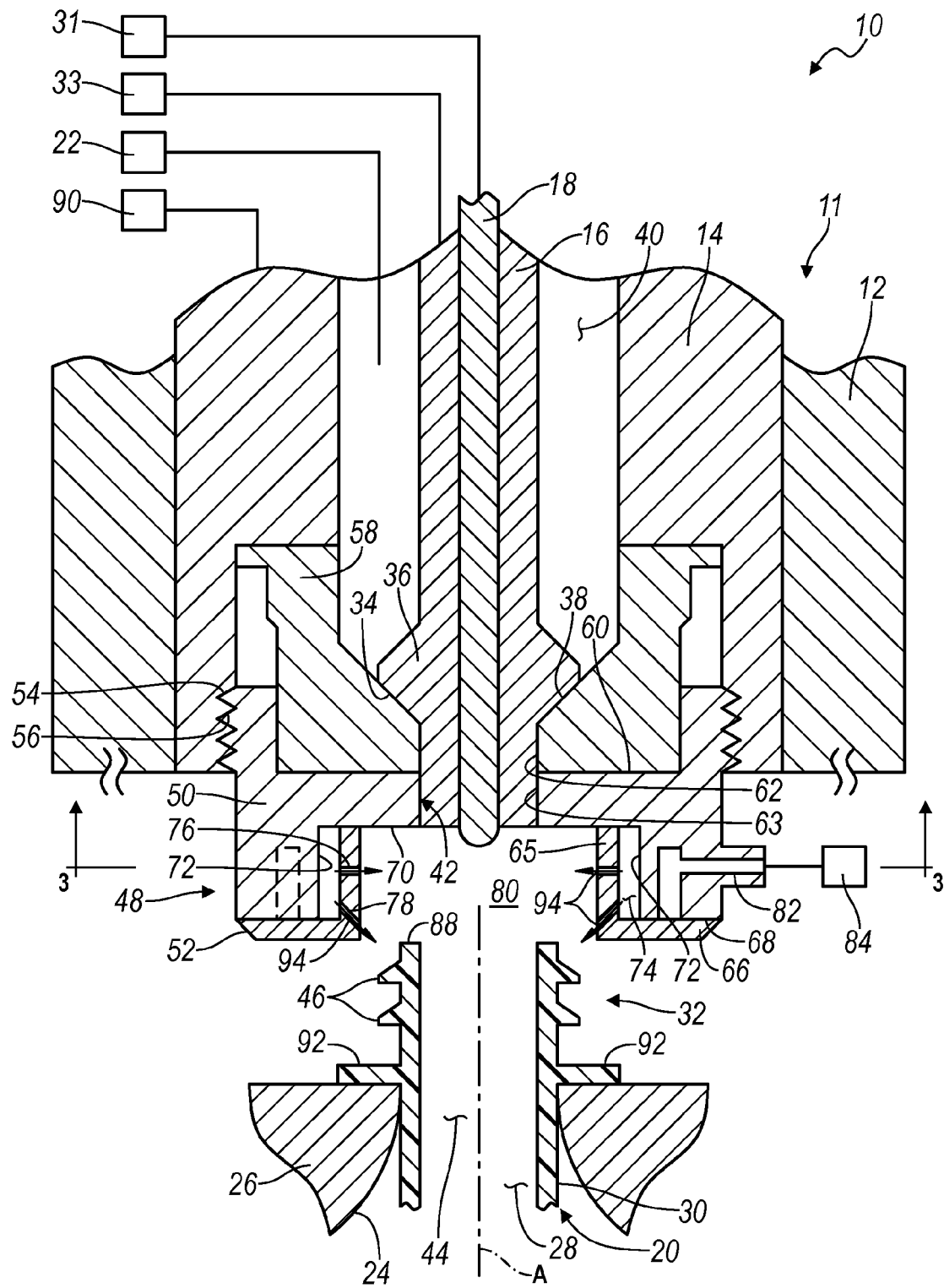
FIG. 1 is a cross-sectional view of a hydraulic blow molding machine embodying the principles of the present invention before engagement of the injection nozzle with a preform.
Figure 2:
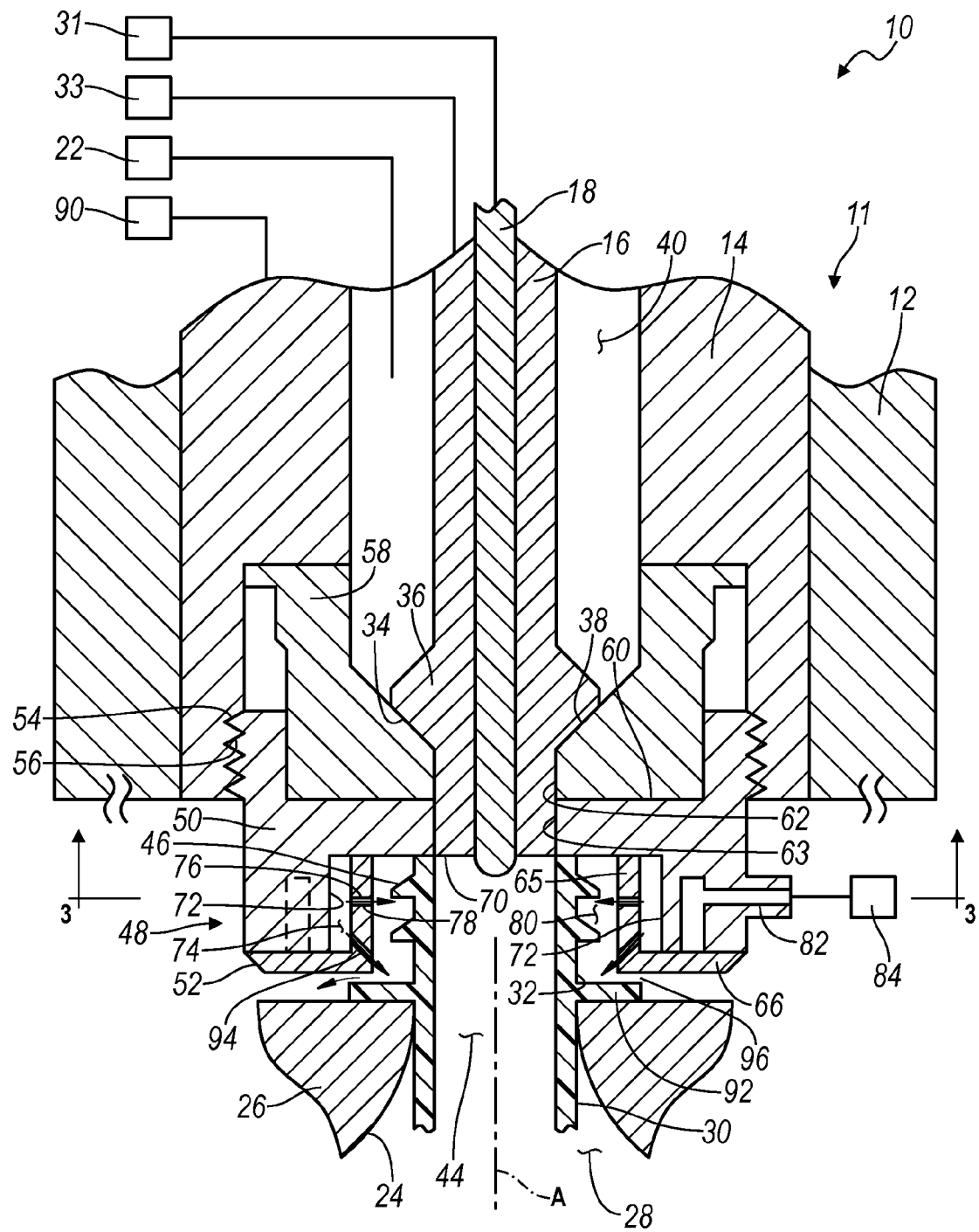
FIG. 2 is a cross-sectional view of the hydraulic blow molding machine seen in FIG. 1 after engagement of the injection nozzle with the preform and showing the exhausting of air between the injection nozzle and the support ring of the preform.

Referring now to the drawings, a hydraulic blow molding machine, used to form a container from a preform, and embodying the principles of the present invention, is schematically illustrate in the figures and generally designated at 10. As its primary components, and as seen in FIGS. 1 and 2, the hydraulic blow molding machine 10 includes an injection head 11 having a housing 12 within which are coaxially located an injection nozzle 14, a seal pin 16 and a stretch rod 18.

The injection head 11 is coupled to a source of blow medium 22 (a liquid that is also the end product retained within the formed container) that is used to expand the preform, designated at 20, into conformity with interior surfaces 24 of a mold 26 that define a mold cavity 28 in the desired shape of the resultant container.

Preforms utilized with the present invention are generally formed by an injection molding process and may be made of any suitable plastic material, such as polyesters including polyethylene terephthalate (PET), polyethylene naphthalate (PEN), and polyethylene imine (PEI), polyolefins including low and high density polyethylene (LDPE and HDPE, respectively) and polypropylene (PP), styrene based materials including polystyrene (PS), acrylonitrile butadiene styrene (ABS) or other polymers including polyvinyl chloride (PVC). The above listing of materials is for illustrative purposes only and is not intended to limit the scope of the invention or the materials used.

The preform 20 has a hollow body 30 extending from an open neck or finish 32, generally along a central axis A, to a closed end (not shown). During molding of the preform 20 into a container, the stretch rod 18 is axially extended by an actuator 31 to elongate the body 30 and the seal pin 16 is retracted by another actuator 33 such that a seal ring 34, defined on a head 36 of the seal pin 16, is disengaged from sealing engagement with a seal seat 38 provided as part of the injection nozzle 14. With the seal ring 34 disengaged from the seal seat 36 and the seal pin 16 sufficiently retracted, the blow medium flows from a central passageway 40 within the injection nozzle 14 through an exit orifice 42 so as to be injected into the interior 44 of the preform 20. As alluded to above, the pressure exerted by the blow medium causes the body 30 of the preform 20 to expand into conformity with the interior surfaces 24 of the mold 26, resulting in formation of the container.

While the body 30 of the preform 20 is elongated and expanded during forming of the container, the finish 32 is provided in its final form and typically includes threads 46 for engagement with corresponding threads of a closure cap (not shown). During hydraulic blow molding, the blowing medium may be at a temperature above ambient and may come in contact with the interior surfaces of the finish 32. As finishes of containers are increasingly being made thinner, to reduce the overall weight of the container, concerns arise that the elevated temperature of the blowing medium may enable distortion and deformation in the shape of the finish, particularly when coupled with the injection pressure of the blow medium, thereby preventing proper engagement by a closure cap. The hydraulic blow molding machine 10, and more specifically the injection nozzle 14, disclosed herein is provided with features that counter and mitigate possible deformation and distortion of the finish 32.

As seen in FIGS. 1 and 2, the end of the injection nozzle 14 is constructed to provide for the cooling of the finish 32 during the hydraulic blow molding process. In this regard, a cooling device 48 is provided as an integral part of the injection nozzle 14. The cooling device 48, which may be referred to as a nozzle body, includes a bell housing 50 and a diffuser 52.

As illustrated, the bell housing 50 is secured to the lower end of the injection nozzle 14 by the engagement of external threads 54 of the bell housing 50 with internal threads 56 of the injection nozzle 14. Other securement means, such as threaded fasteners, could alternatively be employed for this purpose. Also in the illustrated construction, the bell housing 50 is used to secure a sealing bell 58 to the injection nozzle 14 as an integral part thereof. The sealing bell 58 includes the surfaces that cooperate to define central passageway 40 and the seal seat 38 mentioned above. To secure the sealing bell 58, the lower end of the sealing bell 58 is provided with a shape that is received within a correspondingly shaped upper recess 60 formed in an upper end of the bell housing 50, generally adjacent and inwardly of the threads 54. When the bell housing 50 is secured to the injection nozzle 14, a central orifice 62 of the sealing bell 58 is aligned with and extends from a central orifice 63 of the bell housing 58, which together define the exit orifice 42 of the central passageway 40 and injection nozzle 14.

In the lower end of the bell housing 50, opposite of the upper recess 60, the bell housing 50 includes a lower recess 64, within which a portion of the diffuser 52 is received. The diffuser 52 includes a cylindrical wall 65 that is coaxial with the axis-A and a radial flange 66 that extends outwardly from the cylindrical wall 65. In securing the diffuser 52 to the bell housing 50, the upper surface of the radial flange 66 engages the lowermost surface or end face 68 of the bell housing 50 and is secured by threaded fasteners (not shown) that extend through the radial flange 66 into the bell housing 50 or other means. The cylindrical wall 65 is received within the lower recess 62 of the bell housing 50, as mentioned above, and is provided with a length so that its distal end in engagement with a base wall 70 of the lower recess 64. The cylindrical wall 65 is also provided with an outer diameter or width that is less than a width or inner diameter defined between sidewalls 72 of the lower recess 64. As a result, portions of the cylindrical wall 64, radial flange 66, base wall 70 and sidewall 72 cooperate to define a cavity 74 within the nozzle body 48, which is thus provided as a manifold.

Figure 8:
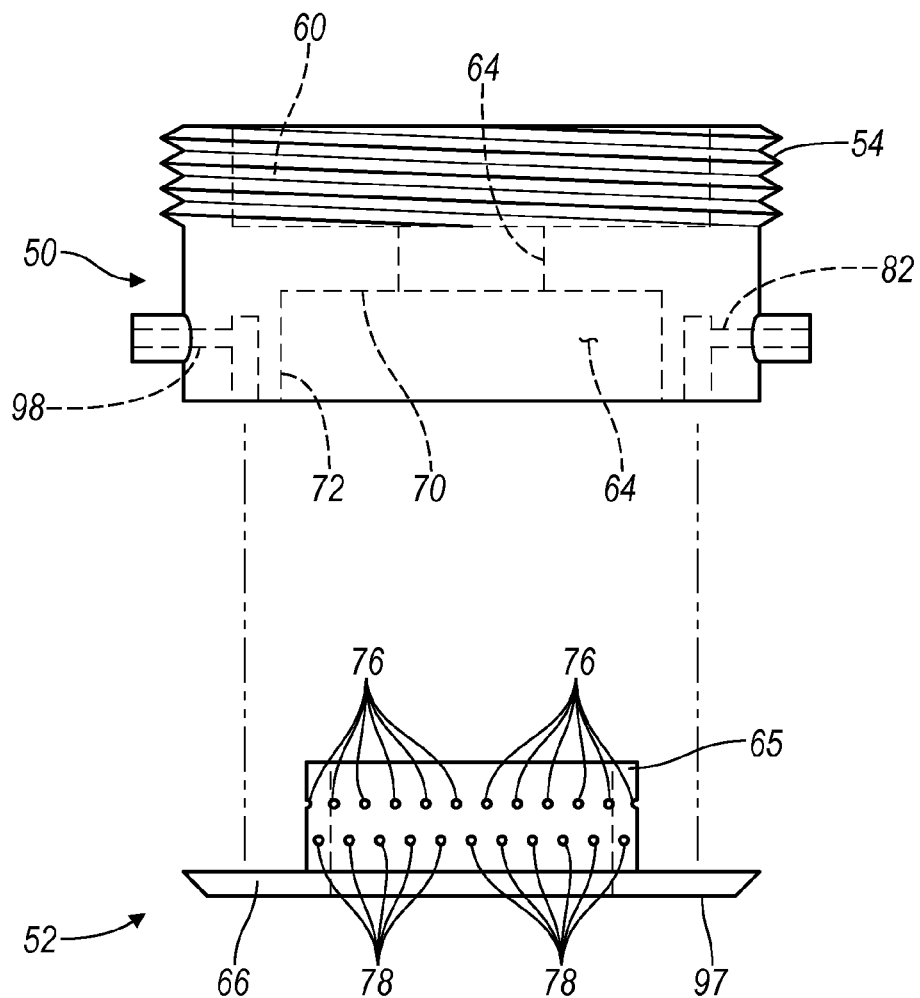
FIG. 8 is an exploded side elevational view of a cooling device embodying the principles of the present invention and that is integrated on the lower end of an injection nozzle; ports in a portion of the cooling device are shown as being arranged in a pair of offset rows.

Additionally, it is noted at this time that ports 76, 78 are defined through the diffuser 52 such that the cavity 74 is in fluid communication with a receiving space 80 that is encompassed and encircled by both the cylindrical wall 64 and the cavity 74. For reasons further explained below, the ports 76, 78 are respectively directed radially and obliquely, relative to the axis-A, into the receiving space 80, and are preferably defined through the cylindrical wall 65 of the diffuser 52. In one preferred embodiment, the ports 76, 78 are arranged in two or more rows around the cylindrical wall 64. The ports 76, 78 may be further arranged such that the ports of one row are radially aligned or radially offset from the ports of the other row. The arrangement of the ports 76, 78 in radially offset rows is best seen FIG. 8 while radially aligned rows are seen in the other figures. It will be appreciated that the diffuser 52 shown in FIG. 8 can alternatively be employed in all embodiments discussed herein.

The bell housing 50 additionally includes an inlet passageway 82 that is coupled to a pressurized source of a cooling medium 84 and that communicates the cooling medium from the source 84 to the cavity 74. The medium is preferably air or another gaseous fluid, so long as the medium has the desired characteristics and meets purposes discussed herein.

Figure 3A:
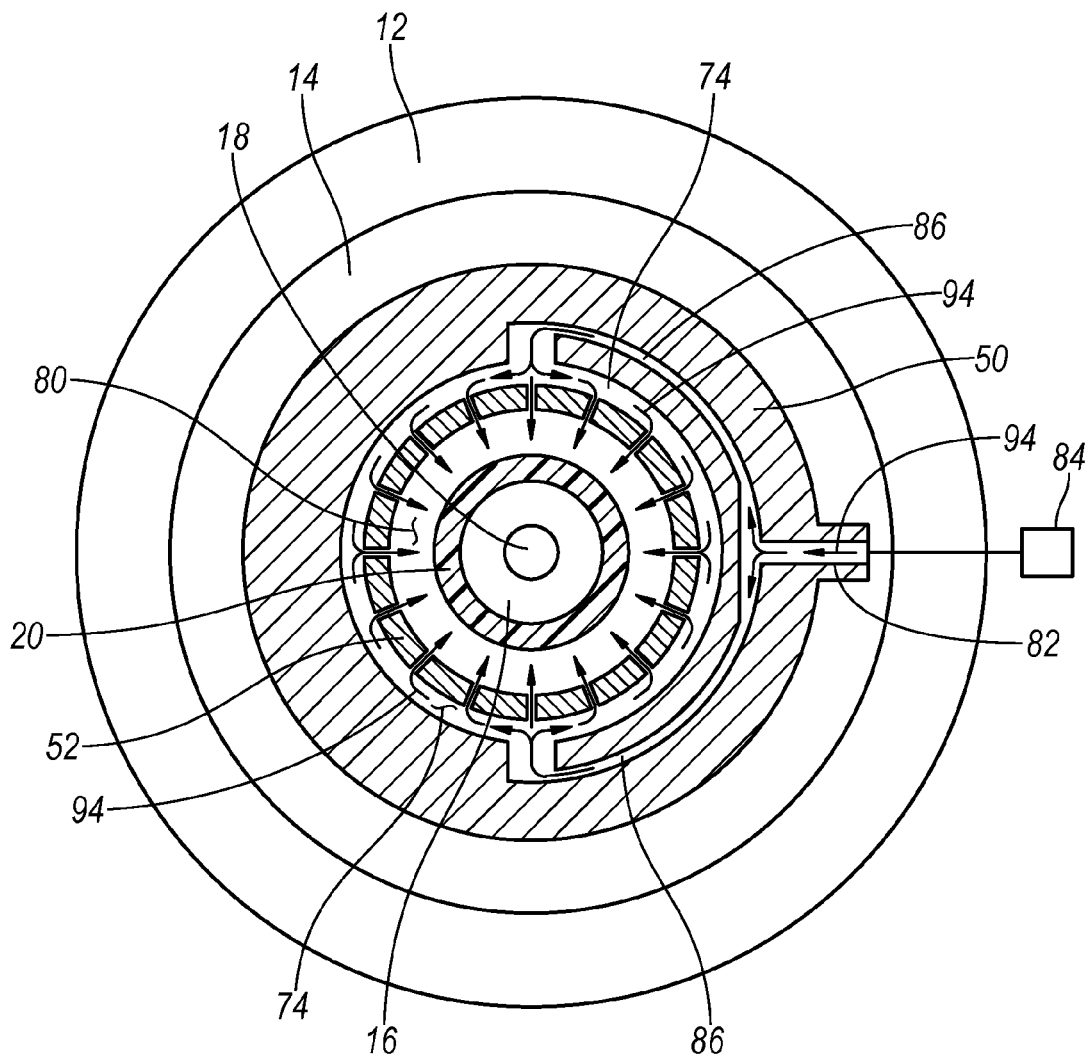
FIG. 3A is a cross-sectional view generally taken along line 3-3 in FIG. 2 and showing a branched inlet passageway within a portion of the injection nozzle.
Figure 3B:
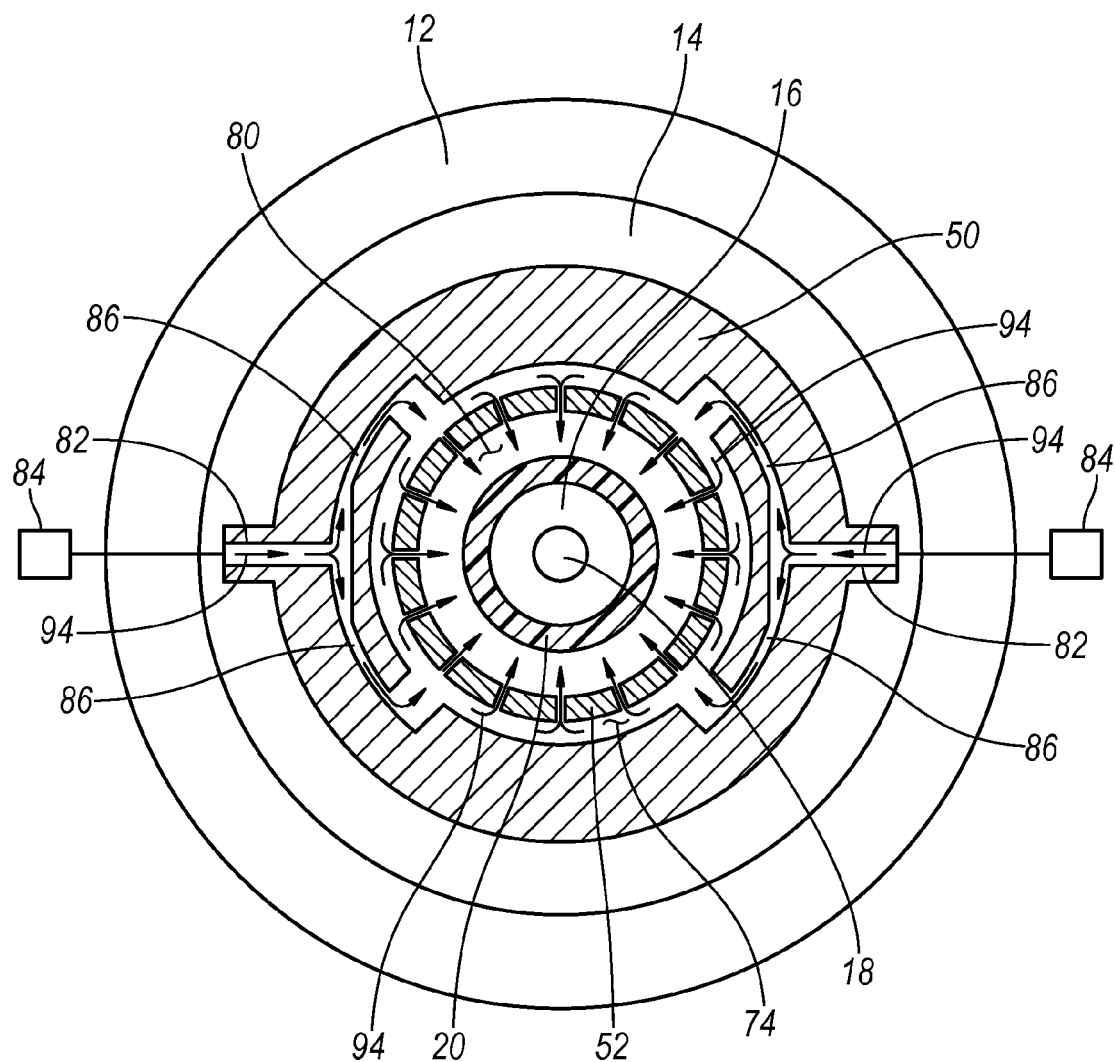
FIG. 3B is a cross-sectional view generally taken along line 3-3 in FIG. 2 showing more than one branched inlet passageway within a portion of the injection nozzle.
Figure 5A:
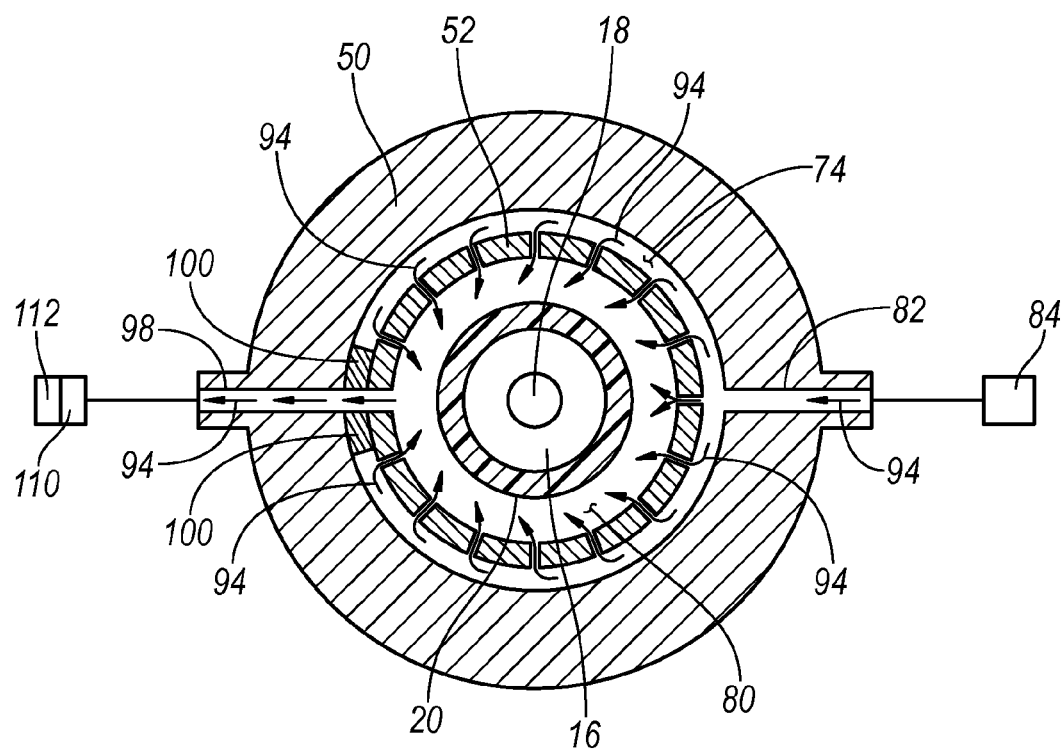
FIG. 5A is a cross-sectional view generally taken along line 5-5 in FIG. 4 and showing variants on how the inlet and outlet passageways may be configured.

As seen in the variants of FIGS. 3A, 3B and 5A, the inlet passageway 82 may be provided in a variety of configurations. In one variant, the inlet passageway 82 extends straight through the wall of the bell housing 50 and terminates in the cavity 74, as seen in FIG. 5A. In another variant, the inlet passageway 82 is branches (designated at 86 in the figures) and extends part-way about the bell housing 50 before terminating into the cavity 74 at diametrically opposed locations, as shown in FIG. 3A. In another variant, the inlet passageway 84 may be defined by multiple passageways 82 that extends in either a straight or branched 86 manner (the latter being shown in FIG. 3B) before terminating into the cavity 74. When branched 86, it is preferred that the inlet passageway 82 terminates into the cavity 74 at locations that are equidistantly spaced about the cavity 74. In this way, the cooling medium is more evenly distributed when provided into the cavity 74. Once provided into the cavity 74, the cooling medium is passed through the ports 76, 78 and directed by the ports 76, 78 into the receiving space 80, and as discussed below, at the finish 32 of a preform 20 located therein.

As seen FIG. 1, the injection head 11 is initially spaced apart from the preform 20 and the mold 26 at the beginning of the hydraulic blow molding process. Prior to being introduced into the mold 26, the body 30 of the preform 20 has been thermally conditioned (heated) to a temperature that will allow the body 30 to be actually stretched by the stretch rod 18 and radially expanded as the blow medium is injected into the interior 44 of the preform 20. In hydraulic blow molding, the blow medium is a liquid, and herein that term is intended to encompass non-gas, flowable mediums. The blow medium may have a low viscosity (like water or alcohol), a medium viscosity (like edible oil or soup) or a high viscosity (like ketchup or yogurt). Also, the blow medium may be homogeneous or non-homogeneous and is not intended to be limited to beverages or foodstuff. Non-limiting illustrative examples of other liquids that may be utilized include cleansing products (for body, house or automotive care), medical fluids, industrial fluids, automotive fluids, and agricultural fluids.

In non-hot fill applications, the blow medium may be provided into the preform at temperatures in the range of about 0° C. to 32° C. (32° F. to 90° F.), but is typically provided at a temperature above ambient and/or the temperature of the body 30 of the preform 20 to minimize freezing of the plastic material during stretching and expansion. During hot fill applications, the blowing medium 22 is provided into the preform 20 at a temperature between about 85° C. and 95° C. (about 185° F. to 195° F.). As a result of the above elevated temperatures, as well as the pressure at which the blow medium is provided, the potential exists for the finish 32 of the preform 20 to be deformed or distorted during the hydraulic blow molding process, particularly when the finish has a thinner wall thickness.

Additionally, at the start of the hydraulic blow molding cycle, the injection nozzle 14 is lowered by its actuator 90 until the finish 32 of the preform 20 is received within the receiving space 80 and injection nozzle engages the preform 20. More specifically, the surface (a first sealing surface) of the base wall 70 of the bell housing 50 sealingly engages with the end surface 88 of the finish 32, forming a first seal therebetween. The downward force exerted by the injection nozzle 14 compressively loads the finish 32 between the end surface 88 and a support ring 92, the latter of which is engaged with the top surface of the mold 26. As further discussed below, the compressive force of this top load can also potentially contribute to distortion and/or deformation of the finish 32.

To compensate for and counteract deformation of the finish 32, the cooling medium provided through the ports 76, 78 may be operated to cool the finish 32 and counteract the effects of the temperature of injected blow medium, and/or to provide a counter pressure that counteract the pressures exerted on the finish 32 by the blow medium and/or top load.

As seen in FIG. 1, the providing of air through the ports 76, 78 may be initiated prior to the injection nozzle 14 being completely lowered and engaged with the end surface 88 of the finish 32. Thus, as the injection nozzle 14 is lowered and the finish 32 is received within the receiving space 80, the finish 32 will be washed over and cooled by a flow of air, designated at 94, from the ports 76, 78. With some of the ports 78 being oriented obliquely to the axis-A, and therefore the finish 32, the cooling medium begins flowing over the finish 32 in advance of the finish being fully received within the receiving space 80, further augmenting the overall cooling effect. To further enhance the cooling effect, the flow of air 94 may be provided at a temperature that is less than ambient, the finish 32, the body 30 or the blow medium.

In one preferred embodiment, shown in FIGS. 1 and 2, the flow of air 94 is provided primarily to effectuate cooling of the finish 32. As seen therein, with the injection nozzle 14 completely lowered, a gap 96 is provided between the manifold 48, and more specifically the radial flange 66 of the diffuser 52, and the support ring 92. The gap 96 forms as an exhaust pathway thereby allowing the flow of air 94 to exit out of the receiving space 80, substantially without restriction to the outside atmosphere. As a result, minimal counter pressure is build up within the receiving space 80 in this embodiment. In applications where the preform 20 did not include a support ring 92, the gap 96 and exhaust pathway would be defined between the manifold 48 and the mold 26.

Figure 4:
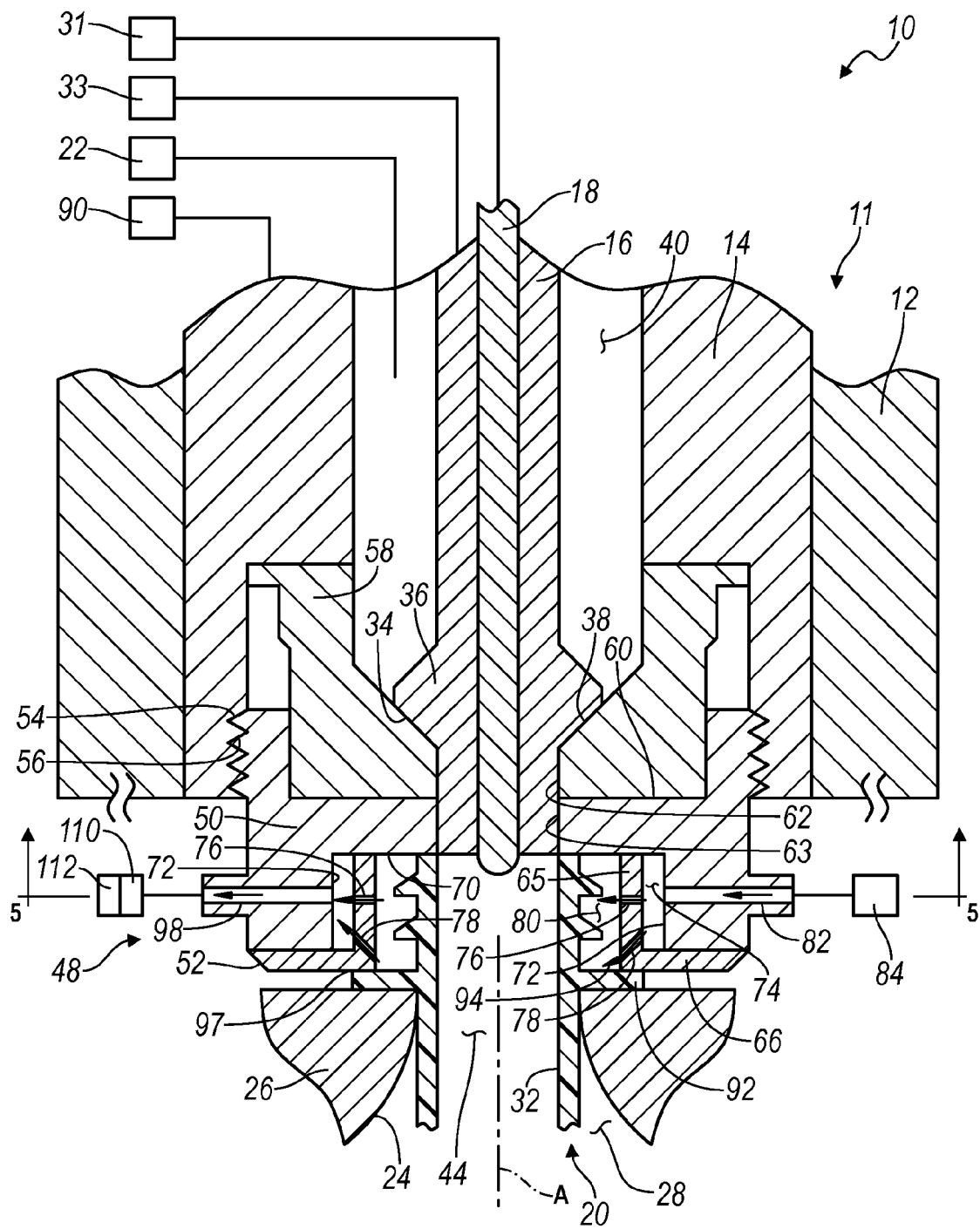
FIG. 4 is a cross-sectional view of a hydraulic blow molding machine according to a second embodiment and showing an outlet passageway that is defined through a portion of the injection nozzle.

In another preferred embodiment, shown in FIG. 4, the length of the manifold 48 in the direction of the axis-A is such that a surface 97 (defining a second sealing surface) of the radial flange 66 of the diffuser 52 sealingly engages the support ring 92 and forms a second seal, spaced axially along the finish 32 from the first seal. With the forming of the second seal, the receiving space 80 is confined and requires an outlet passageway 98 if cooling is to be effectuated by a flow of air 94 over the finish 32. Different variations of outlet passageways 98 are illustrated in FIGS. 5A, 5B, 6 and 7.

As seen in FIG. 5A, both the inlet passageway 82 and the outlet passageway 98 extend in a straight manner through the wall of the bell housing 50. The inlet passageway 82 terminates at the cavity 74, but the outlet passageway 98 is defined so as to communicate with and draw directly from the receiving space 80. In this regard, seals, walls or obstructions 100 are provided in the cavity 74 between the side wall 72 and the cylindrical wall 65 in a manner that seals the outlet passageway 98 from the remainder of the cavity 74 and communicates the outlet passageway 98 directly with the receiving space 80 through one or more of the ports 76, 78. While the inlet passageway 82 is shown in FIG. 5A as extending straight through the wall of the bell housing 50, it will be appreciated that the inlet passageway 82 may alternatively be branched 86, similar to the inlet passageway 82 of the variance seen in FIGS. 3A and 5B.

Figure 5B:
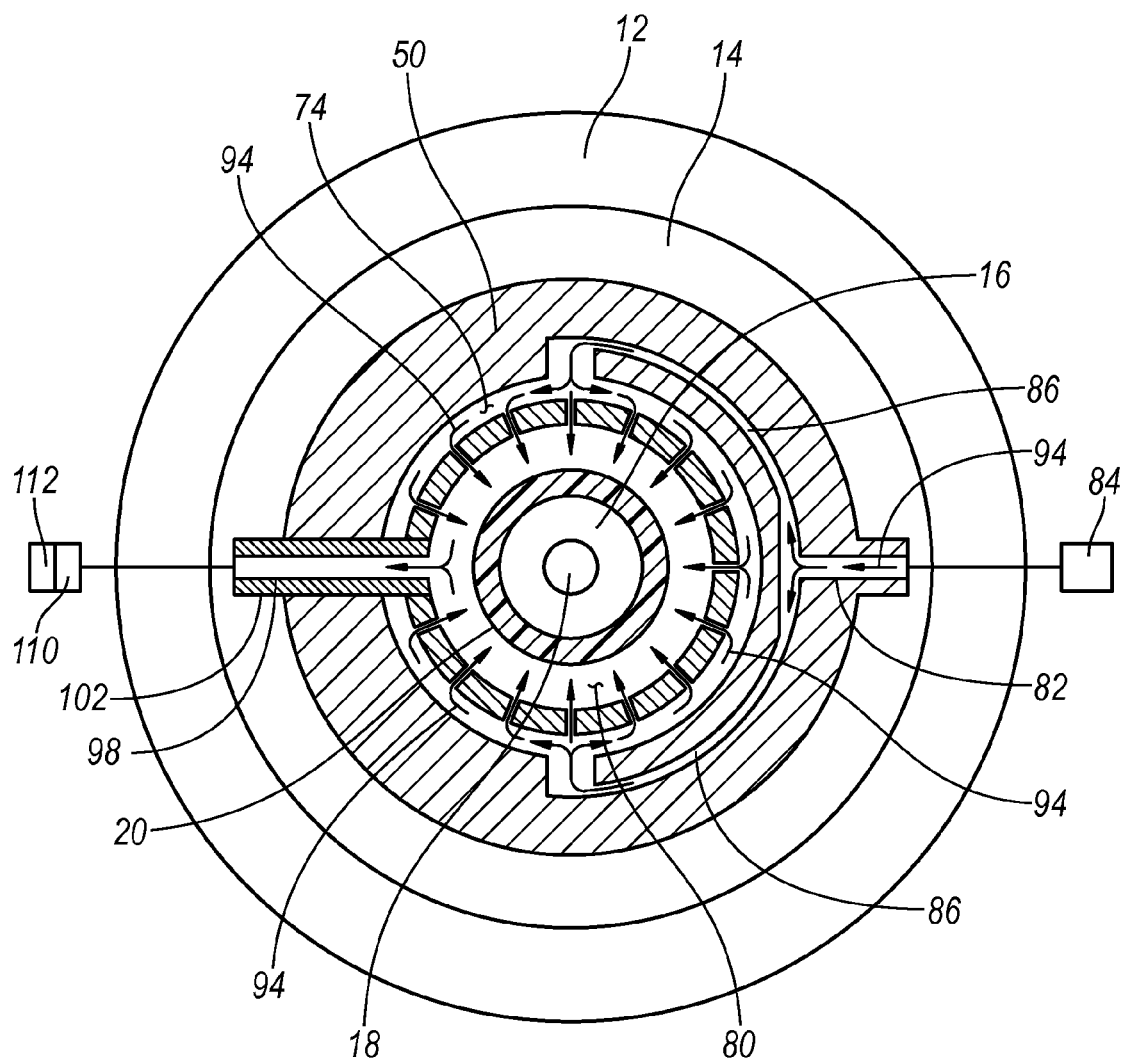
FIG. 5B is a cross-sectional view similar to FIG. 5A and showing additional variants on how the inlet and outlet passageways may be configured.

The outlet passageway 98 may also be defined via an alternative construction than that seen in FIG. 5A. As shown in FIG. 5B, the outlet passageway 98 may be defined by a tube or conduit 102 that extends radially through the bell housing 50, the cavity 74 and the cylindrical wall 64 of the diffuser 52, terminating at the receiving space 80. The outlet passageway 98 may also be provided with a branched construction, similar to the branched construction of the previously discussed inlet passageways 82.

Figure 6:
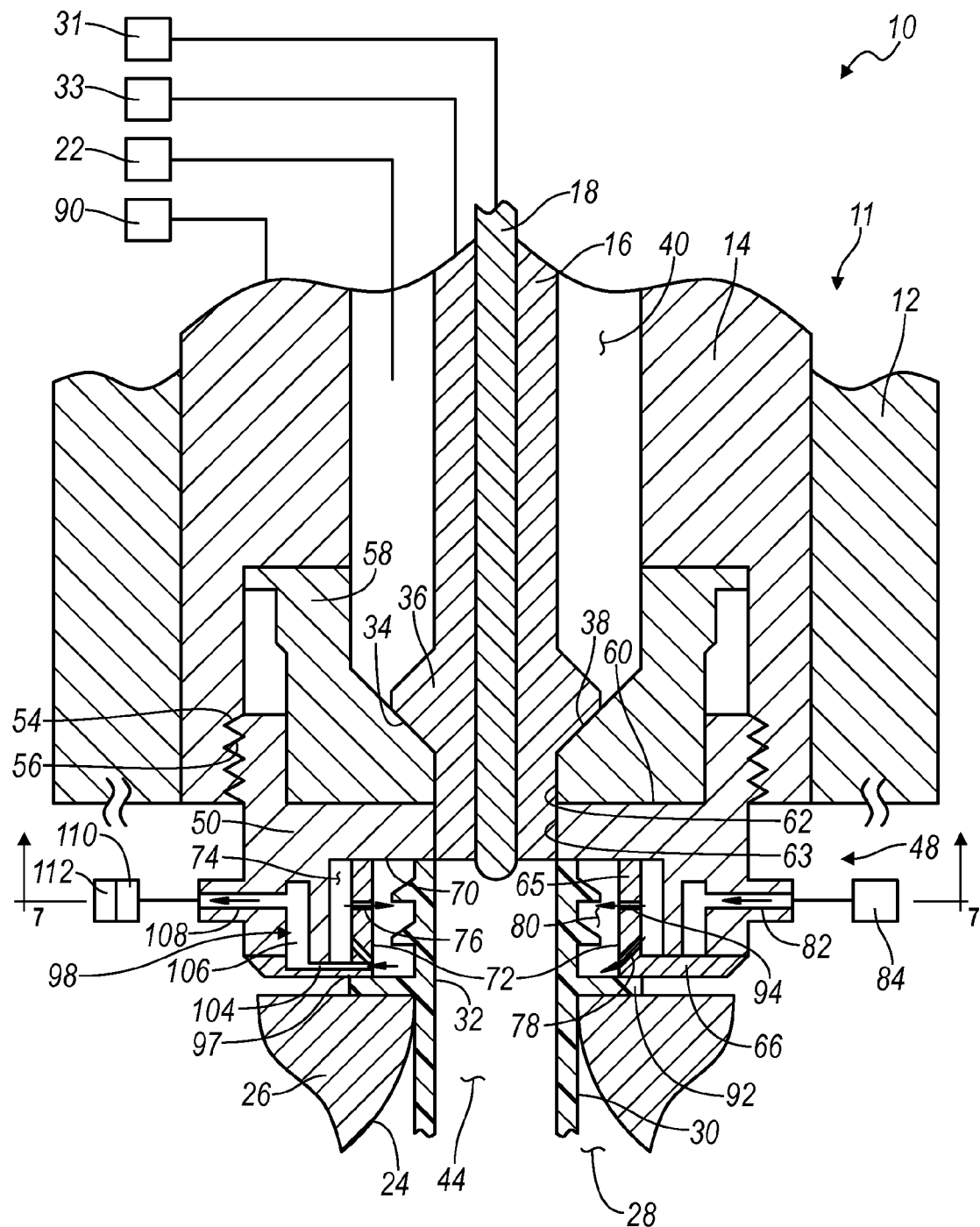
FIG. 6 is a cross-sectional view of a hydraulic blow molding machine and illustrating another variant on how the outlet passageway may be configured to draw air directly from the receiving space.
Figure 7:
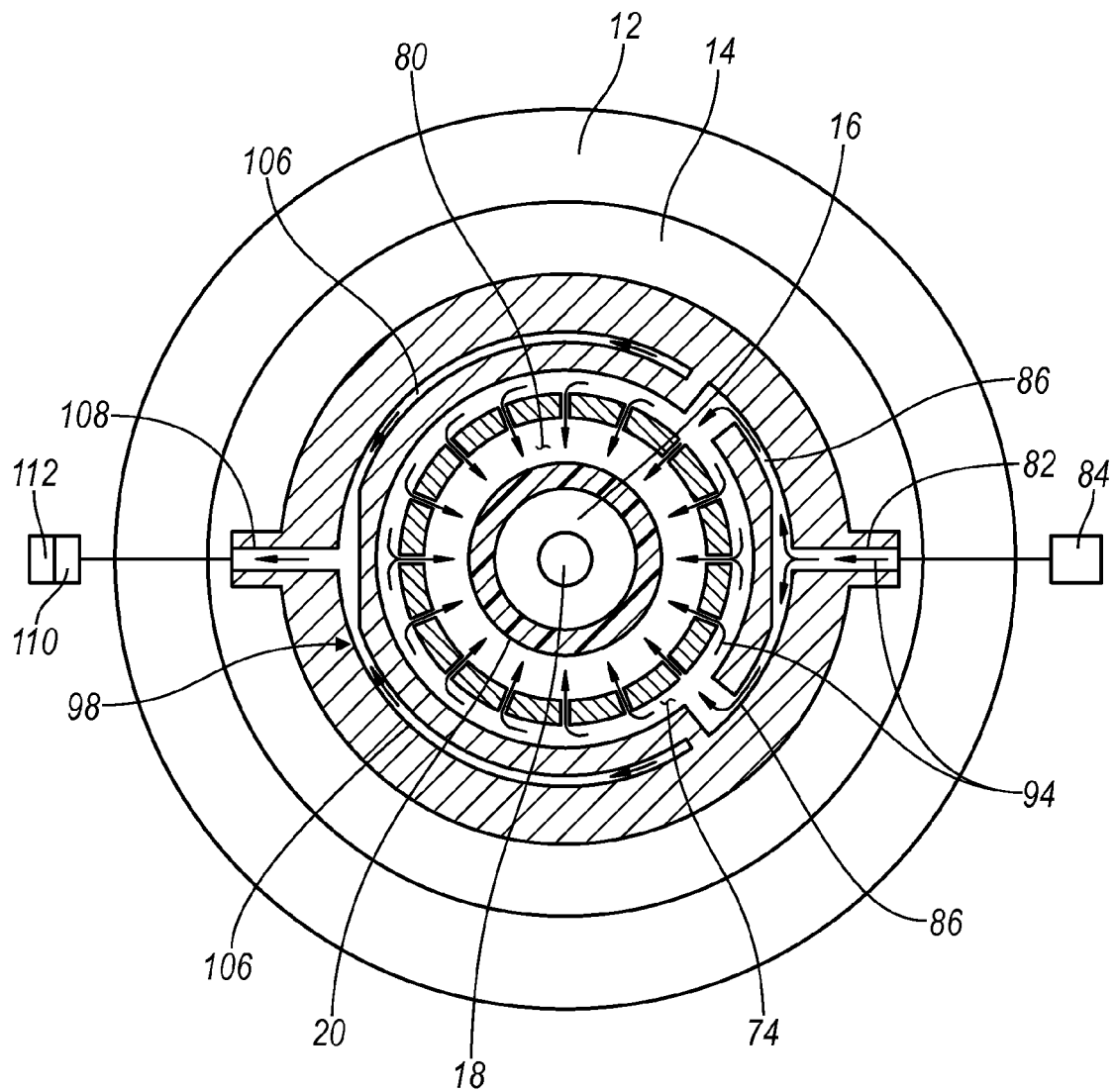
FIG. 7 is a cross-sectional view generally taken along line 7-7 in FIG. 6 and showing portions of the inlet and outlet passageways.

In still another construction, the outlet passageway 98 may extend via a port through both the bell housing 50 and the diffuser 52. In the embodiment of FIGS. 6 and 7, the outlet passageway 98 is defined in part by a series of circumferentially spaced ports 104 (one being shown) that extend from the receiving space 80, radially through the radial flange 66 and then axially through an upper surface of the radial flange 66, where the ports 104 communicate with a channel 106 defined in the bell housing 50. The channel 106, as seen in FIG. 7, extends circumferentially and at least part way about the bell housing 50 and communicates out of the bell housing 50 thorough an exit port 108, somewhat analogous to the inlet passageway 82 and its related branches 86. Providing the channel 106 in this manner facilitates manufacturing by allowing for simple machining and ensures that the outlet passageway 98 can draw from the receiving space 80 in a distributed manner, particularly when the ports 104 are provided in a spaced arrangement in the radial flange 66 of the diffuser 52.

As seen in FIG. 7, the inlet passageway 82 is configured in a manner similar to the embodiment shown in FIG. 3B and includes branches 86. As will be apparent, however, any of the other embodiments for the inlet passageway 82 could be adopted with the outlet passageway 98 shown in FIG. 7.

From the above, it is seen that an injection head 11 embodying the principles of the present invention can effectuate cooling of the finish 32 of a preformed 20 by providing a flow of air 94 about and over the exterior of the finish 32. In the various embodiments, this cooling flow of air 94 is delivered from the medium source 84 through the inlet passageway 82 defined in the bell housing 50. From the inlet passageway 82, the flow of air 94 enters into the cavity 74 defined between the bell housing 50 and the diffuser 52, as previously noted. Since the cavity 74 generally encircles the diffuser 52, the flow of air 94 is distributed substantially completely around the diffuser 52 and provides substantially uniform cooling to the finish 32. This occurs regardless of whether the flow of air 94 is provided through a single inlet into the cavity 74 (as in FIGS. 4 and 5A) or through branched and multiple inlets (as seen in FIGS. 1-3B, 5B, 6, 7 and 9. It is more uniform, however, in the latter instances. From the cavity 74, the flow of air 94 passes through the ports 76, 78 defined in the cylindrical wall 64 of the diffuser 52, which directs the flow of air 94 either perpendicularly or obliquely at the finish 32. If the embodiment is provided with the gap 96 between the radial flange 66 of the diffuser 52 and support ring 92 of the preformed 20, the flow of air 94 may be continuously exhausted through the gap 96 to provide the requisite amount of cooling.

If counteracting the internal pressures and forces applied to the finish 32 of the preform 20 is desired, then one of the embodiments including an outlet passageway 98 may utilized to provide both cooling and/or counter pressure. In these embodiments, which are seen in FIGS. 4-7, the outlet passageway 98 is coupled to a valve 110 and variable restriction 112, which may be integrated into a single unit. The valve and variable restriction 110, 112 can be controlled by way of appropriate controllers (not shown) to initially allow for the free flow of air 94 about the finish 32 to effectuate cooling. Once the injection nozzle 14 has engaged the end surface 88 of the finish 32 and injection of the blow medium has begun, the valve and variable restriction 110, 112 may be used to partially restrict and control the flow of air 94 through the outlet passageway 98, thereby establishing a desired counter pressure around the exterior of the finish 32. It is possible that the flow of air 94 may be completely stopped during the establishment of this counter pressure. With the flow of air 94 stopped, however, cooling of the finish 32 will also cease. If the variable restriction 112 is not completely closed, the flow of air 94 will not be completely obstructed and a limited amount of circulation will permitted, allowing both counter pressure and cooling can be applied in a controlled manner to the finish 32. Preferably, the application of the counter pressure is controlled through the variable restriction 112 such that it corresponds to and is coordinated with the peak and holding pressure of the hydraulic blow molding process, both in terms of the magnitude of the pressure and its duration. Because the injection pressure within the preform 20 builds very quickly, it may be practical to initiate the development of the counter pressure during initial forming and expansion of the preform 20, before the actual peak pressure has been reached, and then coordinate the counter pressure with the peak and holding pressures.

Figure 9:
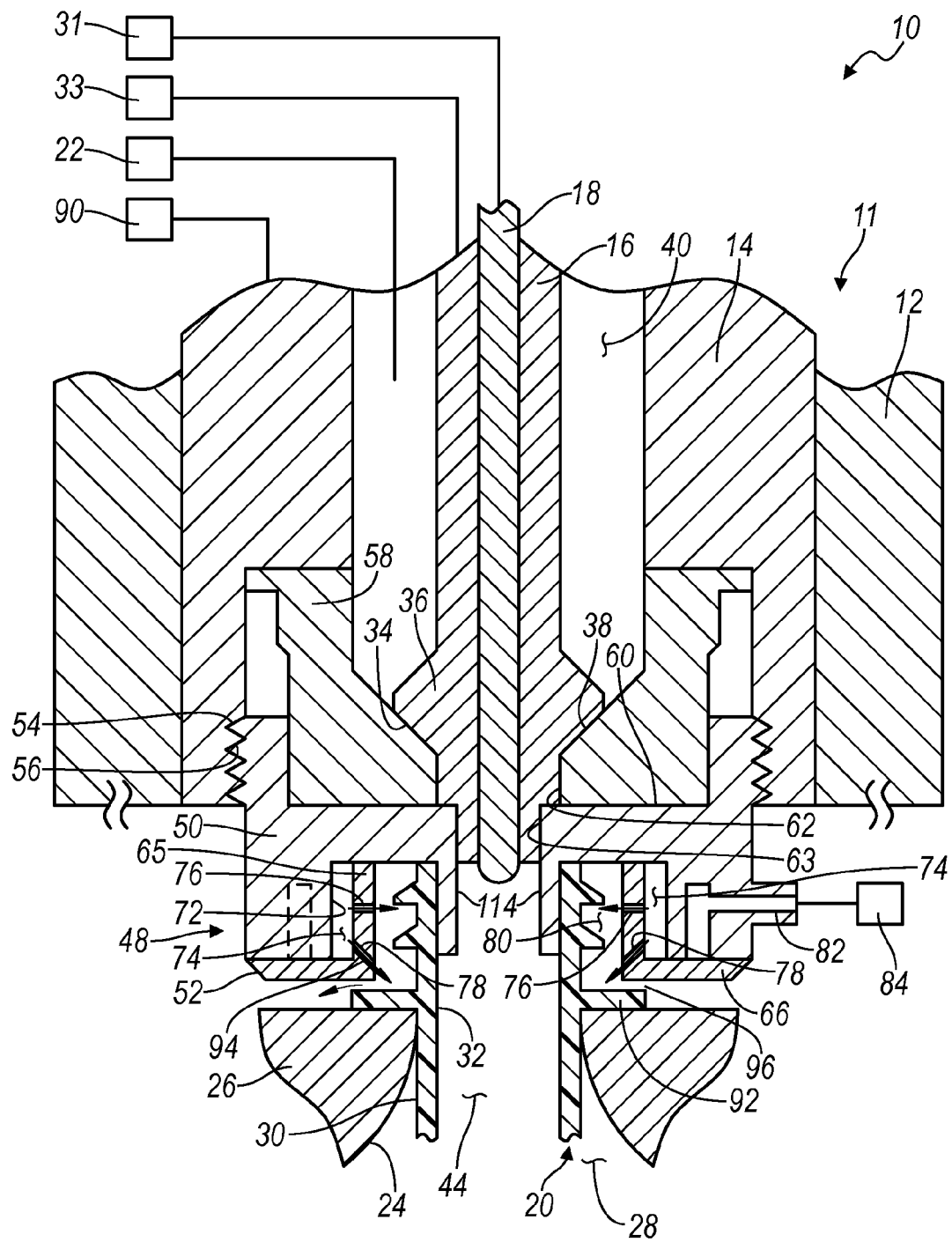
FIG. 9 is a cross-sectional view of hydraulic blow molding machine according to still another embodiment.

Referring now to FIG. 9, an embodiment of the injection head 11 is illustrated therein with a construction substantially the same as that seen in FIGS. 1 and 2. The embodiment of FIG. 9 differs from those earlier embodiments in that the bell housing 50 includes a collar 114 extending axially and defining a portion of the exit orifice 42. When the injection nozzle 14 is engaged with the preform 20, the collar 114 extends into the interior 44 of the preform 20, immediately adjacent to the finish 32. In this manner, the collar 114 supports the finish 32 from the interior and limits exposure of the finish 32 to the temperature of the injected blow medium. It will be appreciated that the collar 114 may be incorporated into any the embodiments discussed herein.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. An injection nozzle for receiving a finish of a preform and forming of a container from the preform by injecting of a liquid blow medium into the preform, the injection nozzle comprising:

a central passageway defined through the injection nozzle and coupled to a source of liquid blow medium a nozzle body provided at one end of the injection nozzle, the nozzle body defining a receiving space adapted to receive the finish of the preform, the receiving space being coaxial with the central passageway and being configured for fluid communication therewith, the nozzle body defining a first sealing surface about the central passageway and adapted to engage an end surface of the preform;

at least one inlet passageway defined through the nozzle body and communicating with the receiving space;

the nozzle body being a manifold having a cavity defined therein, portions of the cavity being defined by an inner wall and an outer wall of the manifold, a plurality of ports defined through the inner wall and communicating the cavity with the receiving space, the at least one inlet passageway terminating in communication with the cavity;

a source of cooling medium at a temperature less than the temperature of the finish of the preform, the source of cooling medium being in fluid communication with the inlet passageway; and wherein cooling medium received from the at least one inlet passageway into the cavity is directed through at least some of the ports toward the finish of the preform located within the receiving space to uniformly cool the finish of the preform.

2. The injection nozzle according to claim 1, wherein the ports are located circumferentially about the inner wall.

3. The injection nozzle according to claim 1, wherein the ports are equally spaced about the inner wall.

4. The injection nozzle according to claim 1, wherein the ports defined two rows of ports about the inner wall.

5. The injection nozzle according to claim 4, wherein the ports of each of the two rows of ports are circumferentially offset from one another.

6. The injection nozzle according to claim 4, wherein the ports of one of the rows are perpendicularly oriented relative to a central axis (A) extending longitudinally through the receiving space, the ports of the other of the rows are obliquely oriented relative to the central axis (A).

7. The injection nozzle according to claim 1, wherein at least some of the ports are perpendicularly oriented with respect to a central axis (A) extending longitudinally through the receiving space.

8. The injection nozzle according to claim 1, wherein at least some of the ports are obliquely oriented with respect to a central axis (A) extending longitudinally through the receiving space.

9. The injection nozzle according to claim 1, wherein the cavity at least partly encircles the receiving space.

10. The injection nozzle according to claim 1, wherein the cavity completely encircles the receiving space.

11. The injection nozzle according to claim 1, wherein the inlet passageway includes branch passageways that terminate in the cavity at diametrically opposed positions from one another.

12. The injection nozzle according to claim 11, further comprising a longitudinal axis (A) extending through the receiving space, wherein the branch passageways are symmetrical to each other with respect to a symmetry plane including the longitudinal axis.

13. The injection nozzle according to claim 10, wherein the manifold defines a second sealing surface adapted to engage the preform or a mold receiving the preform, the second sealing surface being at a location axially spaced apart from the first sealing surface.

14. The injection nozzle according to claim 13, wherein the second sealing surface engages a support ring formed on the preform.

15. The injection nozzle according to claim 13, wherein an outlet passageway is defined through the manifold and terminates in communication with the cavity, and wherein the cooling medium from the receiving space is directed through the ports into the cavity and from the cavity into the outlet passageway.

16. The injection nozzle according to claim 13, wherein the outlet passageway is defined through the manifold and terminates in communication with the receiving space without passing through the cavity.

17. The injection nozzle according to claim 14, wherein the outlet passageway terminates in the cavity at a location diametrically opposed from a location where the inlet passageway terminates in the cavity.

18. The injection nozzle according to claim 13, wherein the outlet passageway is coupled to a valve.

19. The injection nozzle according to claim 18, wherein the valve includes a variable restriction.

20. The injection nozzle according to claim 1, wherein an exhaust pathway from the receiving space is defined between the inner wall and a support ring of the preform.

21. The injection nozzle according to claim 1, wherein the manifold is formed by a bell housing and a diffuser attached thereto, the inner wall being a wall of the diffuser and the outer wall being a wall of the bell housing.

22. The injection nozzle according to claim 1 in an assembly further comprising a preform and a mold, the injection nozzle being movable with respect with the mold between a reception configuration allowing introduction of at last a portion of a body of the preform into the mold and a fluidic connection configuration wherein the first sealing surface engages an end surface of the preform and presses a support ring of the preform against the mold.

23. The injection nozzle in an assembly according to claim 22, wherein when in the fluidic connection configuration, the receiving space is in communication with the outside atmosphere by an exhaust pathway defined between the manifold and the support ring of the preform or between the manifold and the mold.

* * * * *